US012689803B2

(12) United States Patent
Docherty et al.

(10) Patent No.: US 12,689,803 B2
(45) Date of Patent: Jul. 21, 2026

(54) SYSTEM AND METHOD FOR PROVIDING CONTEXT RECOMMENDATIONS

(71) Applicant: ThinkAnalytics Ltd., Glasgow (GB)

(72) Inventors: Peter Docherty, Glasgow (GB); Christopher McGuire, Glasgow (GB); Alan Ryman, Glasgow (GB); Bryan Bossard, Canyon Country, CA (US); Asim Ullah, Glasgow (GB)

(73) Assignee: ThinkAnalytics Ltd., Glasgow (GB)

( * ) Notice: Subject to any disclaimer, the term of this patent is extended or adjusted under 35 U.S.C. 154(b) by 108 days.

(21) Appl. No.: 18/130,894

(22) Filed: Apr. 4, 2023

(65) Prior Publication Data

US 2024/0340499 A1 Oct. 10, 2024

(51) Int. Cl.

*H04N 21/466* (2011.01)
*G06F 16/783* (2019.01)
*H04N 21/458* (2011.01)

(52) U.S. Cl.

CPC ....... *H04N 21/4668* (2013.01); *G06F 16/783* (2019.01); *H04N 21/458* (2013.01)

(58) Field of Classification Search

CPC . H04N 21/4668; H04N 21/458; G06F 16/783
USPC ........................................................... 725/34
See application file for complete search history.

(56) References Cited

U.S. PATENT DOCUMENTS 6,567,814 B1 5/2003 Bankier et al.
7,805,129 B1 9/2010 Issa et al.
9,699,491 B1 7/2017 Docherty et al.
9,756,390 B1 9/2017 Docherty et al.
9,906,837 B1 2/2018 Docherty et al.
9,973,797 B1 5/2018 Docherty et al.
10,091,555 B1 10/2018 Docherty et al.
10,289,739 B1 5/2019 Docherty et al.
10,356,035 B1 7/2019 Gravino et al.
10,412,454 B2 9/2019 Docherty et al.
11,004,135 B1 5/2021 Sandler et al.
11,212,584 B2 12/2021 Docherty et al.
11,343,573 B2 5/2022 Docherty et al.
2003/0106064 A1 6/2003 Plourde
2007/0157222 A1 7/2007 Cordray et al.
2008/0304812 A1 12/2008 Jin
2009/0271826 A1 10/2009 Lee et al.
2010/0005492 A1 1/2010 Takano et al.
(Continued)

FOREIGN PATENT DOCUMENTS

EP 1 317 143 6/2003
EP 2 207 348 7/2010
(Continued)

*Primary Examiner* — Ngoc K Vu
(74) *Attorney, Agent, or Firm* — Foley & Lardner LLP

(57) ABSTRACT

A computer-implemented method for generating one or more content recommendation, the method comprising: opening a content recommendation session for a selected user, wherein, as part of the session, a content recommendation procedure for generating one or more recommendation candidates based on a seed content item or seed content item identifier is available; receiving a request representing one or more desired content attributes; performing the content recommendation procedure thereby to generate one or more content recommendation candidates for the desired content attributes.

18 Claims, 7 Drawing Sheets

(56) References Cited

U.S. PATENT DOCUMENTS

| | | | | |
|---|---|---|---|---|
| 2010/0070507 | A1 | 3/2010 | Mori | |
| 2011/0243529 | A1 | 10/2011 | Oryoji et al. | |
| 2013/0086082 | A1* | 4/2013 | Park | G06F 16/9535 707/748 |
| 2014/0149344 | A1 | 5/2014 | Pudipeddi et al. | |
| 2014/0279756 | A1 | 9/2014 | Whitman | |
| 2015/0082330 | A1 | 3/2015 | Yun et al. | |
| 2015/0100987 | A1 | 4/2015 | Whitman et al. | |
| 2015/0269488 | A1 | 9/2015 | Galai et al. | |
| 2016/0147767 | A1* | 5/2016 | Manning | G06F 16/951 715/716 |
| 2016/0196580 | A1 | 7/2016 | Hong et al. | |
| 2016/0299906 | A1* | 10/2016 | Cartoon | G06F 16/4387 |
| 2017/0311015 | A1 | 10/2017 | Docherty et al. | |
| 2019/0364338 | A1* | 11/2019 | Docherty | H04N 21/4756 |
| 2020/0193552 | A1 | 6/2020 | Turkelson et al. | |
| 2020/0252690 | A1 | 8/2020 | Docherty et al. | |
| 2020/0409983 | A1 | 12/2020 | Miller | |
| 2021/0406736 | A1 | 12/2021 | Sennik et al. | |
| 2023/0162033 | A1 | 5/2023 | Kadam | |
| 2023/0418872 | A1* | 12/2023 | Lamere | G06F 16/4387 |
| 2024/0242106 | A1 | 7/2024 | Shamir et al. | |
| 2024/0257214 | A1 | 8/2024 | Vashishtha et al. | |

FOREIGN PATENT DOCUMENTS

| | | |
|---|---|---|
| GB | 2 574 581 | 12/2019 |
| WO | WO-01/15449 | 3/2001 |
| WO | WO-02/27526 | 4/2002 |
| WO | WO-2008/042242 | 4/2008 |
| WO | WO-2013/186061 | 12/2013 |
| WO | WO-2021/3130834 | 7/2021 |

* cited by examiner

Table 1 – CRE learning tables

| Section Number | DB Table name |
|---|---|
| Subscriber Timeslot Learning tables | |
| 10.1 | re_sub_ts_learned_language |
| 10.4 | re_sub_ts_content_item_ratings |
| 10.5 | re_sub_ts_feature_ratings |
| 10.6 | re_sub_ts_watched_episodes |
| | |
| Customer Learning tables: | |
| 7.1 | re_customer_learned_language |
| 7.4 | re_content_item_ratings |
| 7.5 | re_feature_ratings |
| 7.6 | re_customer_watched_episodes |
| | |
| Session Learning tables | |
| 12.1 | re_session_learned_language |
| 12.4 | re_session_content_item_ratings |
| 12.5 | re_session_feature_ratings |
| 12.6 | re_session_watched_episodes |
| | |
| Cookie Learning tables | |
| 14.1 | re_cookie_learned_language |
| 14.4 | re_cookie_content_item_ratings |
| 14.5 | re_cookie_feature_ratings |
| 14.6 | re_cookie_watched_episodes |
| | |
| Subscriber Combined Learning tables | |
| 9.1 | re_sub_learned_language |
| 9.4 | re_sub_content_item_ratings |
| 9.5 | re_sub_feature_ratings |
| 9.6 | re_sub_watched_episodes |

Fig. 2

SYSTEM AND METHOD FOR PROVIDING CONTEXT RECOMMENDATIONS

FIELD

The present disclosure relates generally to a content recommendation system and method, in particular to a method of and system for providing a context based recommendation.

BACKGROUND

Developments in technology mean that users are able to access content via a wide array of different mechanisms, and via a wide array of different sources. For example, television channels, radio stations, video-on-demand and other streaming services, social media and other internet content sources provide a vast array of content available to a user. In some systems, it may be required to apply additional constraints on any recommendations, for example, constraints relating to commercial, business and/or legal factors.

There are different types of content recommendation procedures that may be applied to, for example, content metadata to output content recommendation candidates. One type of desired recommendation is a so-called context request, in which a set of desired attributes are passed to the recommendation request and the request returns a number of relevant results. A technical problem that may encountered in known approaches to context requests is the processing time, in particular, when the number of desired attributes is large. The processing time for a single request is to be understood in the context of time constraints demanded by particular content providers, or expected by users, which may be particularly demanding and in some cases prohibitive for providing the types of searches and results that are desired. This can present a significant technical challenge, particularly as the system is usually hosted on one or more servers remote from the set top box or other device and, for systems with millions of subscribers, may have to deal simultaneously with over a million user actions or interactions per minute during busy periods.

SUMMARY

In accordance with a first aspect, there is provided a computer-implemented method for generating one or more content recommendation, the method comprising:

- opening a content recommendation session for a selected user, wherein, as part of the session, a content recommendation procedure for generating one or more recommendation candidates based on a seed content item or seed content item identifier is available;
- receiving a request representing one or more desired content attributes;
- optionally generating a dummy content item having metadata representing the one or more desired content attributes;
- performing the content recommendation procedure, optionally based on the generated dummy content item, thereby to generate one or more content recommendation candidates for the desired content attributes.

Performing the content recommendation procedure may comprise: obtaining metadata associated with the dummy content item or a corresponding dummy content item identifier; and identifying related content comprising content associated with one or more of the same or similar metadata.

The content attributes may comprise any property, parameter and/or characteristic capable of distinguishing one or more content items.

The content attributes may comprise at least one of: Actor; Audience; Award; Category; Character; Character Type; Concept Source; Director; Format; Franchise; Host; Mileu; Mood; Producer; Person; Subcategory; Scenario; Setting; Sports Competition; Studio; Style; Subject; Team; Theme; Time Period; Writer.

The generated dummy content item may comprise a transitory content item. The method may comprise deleting the dummy content item from storage after completion of the content recommendation procedure.

Generating the dummy content item may comprise creating an instance of a content item object and generating associated metadata for the content item object.

The content attributes and their associated weighting may be represented mathematically as a feature vector and wherein generating the dummy content item comprises assigning values to the feature vector so that the feature vector represents the desired attributes.

Performing the recommendation procedure may comprise determining a set of closest feature vectors to the feature vector wherein the recommendation candidates correspond to the determined set of nearest feature vectors.

The method may comprise receiving user input and wherein the content attributes are generated based on keywords derived from user input. The method may comprise processing said user input to extract one or more keywords.

The method may comprise processing an audio input sample to extract content attributes and/or attribute weightings for the request.

The method may comprise performing a comparison between at least some of the received user input and a stored list of attributes to determine the content attributes and/or attribute weightings.

The method may comprise displaying an interactive interface comprising a plurality of interactive elements, wherein the method comprises receiving user input representing interaction with said interactive elements and determining the desired content attributes based on said interaction, and displaying the recommended content candidates via a plurality of further interactive elements on the interface.

The method may comprise receiving further user input representing a modification of the content attributes and performing a further content recommendation process using the modified content attributes; updating the displayed recommended content candidates based on the further content recommendation process.

The modification of the content attributes may comprise addition and/or removal of attributes.

The method may comprise performing one or more selection and/or filtering and/or ranking procedures on the one or more content recommendation candidates based on obtained user data.

The ranking, selecting and/or filtering may be performed prior to providing the one or more recommendations to the user device The user data may be based on one more user actions comprising one or more of: selecting, viewing, purchasing, recording, reading, listening to, playing, sharing, rating, commenting on or otherwise interacting with content.

The method may comprise using the dummy seed content item identifier to generate a plurality of non-personalised content item recommendations; and sorting, filtering and/or ranking the plurality of non-personalised content item recommendations using user data. The user data may be stored in a user profile.

The sorting, filtering and/or ranking of the plurality of non-personalised content item recommendation candidates may comprise using content metadata or more other items of user data to identify one or more of the non-personalised content item recommendations that represent a closest match with the user data.

The method may further comprise presenting the one or more personalised content item recommendation candidates to the user in order from closest match to least closest match.

Identifying the closest match may comprise comparing metadata associated with the non-personalised content item recommendations with metadata associated or represented by the user data.

Using the dummy content item and/or identifier to generate a plurality of non-personalised content item recommendations may comprise: obtaining metadata associated with the dummy content item identified by the dummy content item identifier; and identifying related content comprising content associated with one or more of the same or similar metadata.

The method may comprise providing one or more of the content item recommendation candidates to a user device. Providing the one or more recommendation candidates may comprise instructing the user device to display the one or more personalised content item recommendations for selection by the user.

The method may comprise monitoring user activity including identifying content that the user of the user device has interacted with and adding content item identifiers, for the identified content, to the user data.

The content may comprise one or more of: television content; movies; videos; games; books; or music.

The user data may be stored in a first memory resource remote from the user device, the first memory resource storing user profiles for a plurality of users of a content distribution system; and the content may be stored in a second memory resource remote from the first memory resource, the second memory resource storing items of content for the content distribution system.

The method may comprise providing a wrapper function. The steps of receiving the request, generating the dummy content item and performing the content recommendation procedure are contained in a wrapper function or procedure. The method may comprise performing the wrapper function or procedure.

The wrapper function may be configured to receive at least the desired content attributes and input. The wrapper function may be configured to receive substantially the same format of input as an existing procedure, for example, a content based procedure. The method may comprise selecting the wrapper function or the existing procedure as part of a content recommendation process.

In accordance with a second aspect, there is provided a system comprising processing circuitry configured to: open a content recommendation session for a selected user, wherein, as part of the session, a content recommendation procedure for generating one or more recommendation candidates based on a seed content item or seed content item identifier is available; receive a request representing one or more desired content attributes; optionally generate a dummy content item having metadata representing the one or more desired content attributes; perform the content recommendation procedure, optionally based on the generated dummy content item, thereby to generate one or more content recommendation candidates for the desired content attributes.

In accordance with a third aspect there is provided a non-transitory computer-readable medium that comprises computer-readable instructions that are executable to: open a content recommendation session for a selected user, wherein, as part of the session, a content recommendation procedure for generating one or more recommendation candidates based on a seed content item or seed content item identifier is available; receive a request representing one or more desired content attributes; generate a dummy content item having metadata representing the one or more desired content attributes; perform the content recommendation procedure based on the generated dummy content item thereby to generate one or more content recommendation candidates for the desired content attributes.

Features in one aspect may be provided as features in another aspect. For example, method features may be provided as apparatus features and vice versa.

BRIEF DESCRIPTION

Various aspects of the invention will now be described by way of example only, and with reference to the accompanying drawings, of which:

FIG. 2 is representation of certain database learning tables used by the system of FIG. 1;

DETAILED DESCRIPTION

As mentioned above, a technical problem that may be encountered in known approaches to context requests is the processing time, in particular, when the number of desired attributes is large. Presently, when a request for assets (content items) matching a list of features (content attributes) is required, this is performed as a so-called context request. Present approaches to context requests return results for an "OR" type request for the desired content attributes (for example, features, genres, subgenres, etc) such that, at a first step, the content recommendation candidates are returned to include all content items that match at least one of the desired attributes. This set may be further orders, for example, sorted by user profile features. This large set of content recommendation candidates does not correspond to the best or closest match to the list of desired content attributes.

A second step is typically performed to align the results with the desired set of attributes. In this second step, a filter is applied for each of the desired attributes. This step is similar to an "AND" type request. The first and second steps may be applied together using a string request such as "genre=movie&filterGenre=movie" for each desired attribute. The combination of "OR" to return content for the desired features and "AND" to filter out content that does not match all of the desired features can be slow and, may be prohibitively slow.

The time to respond to a request is to be understood in the context of the content recommendation system. For example, the time constraints demanded by particular content providers, or expected by users, may be particularly demanding and in some cases prohibitive for providing the types of searches and results that are desired. This can present a significant technical challenge, particularly as the system is usually hosted on one or more servers remote from the set top box or other device and, for systems with millions of subscribers, may have to deal simultaneously with hundreds of thousands of user actions or interactions per minute during busy periods.

The following embodiments relates to a system and method of providing content recommendations to users of a content recommendation system, in particular, to a system and method for a content recommendation procedure that uses an item based recommendation procedure.

It will be understood that a context based procedure is a procedure that receive one or more desired content attributes that represent a context as input and generate one or more content recommendation candidates based on the desired content attributes. In contrast, an item based recommendation procedure is a procedure that generates one or more recommendation candidates based on a seed content item or seed content item identifier. The procedure of the following embodiments is configured to receive content attributes and use an item based procedure to generate the results.

Figure 1:
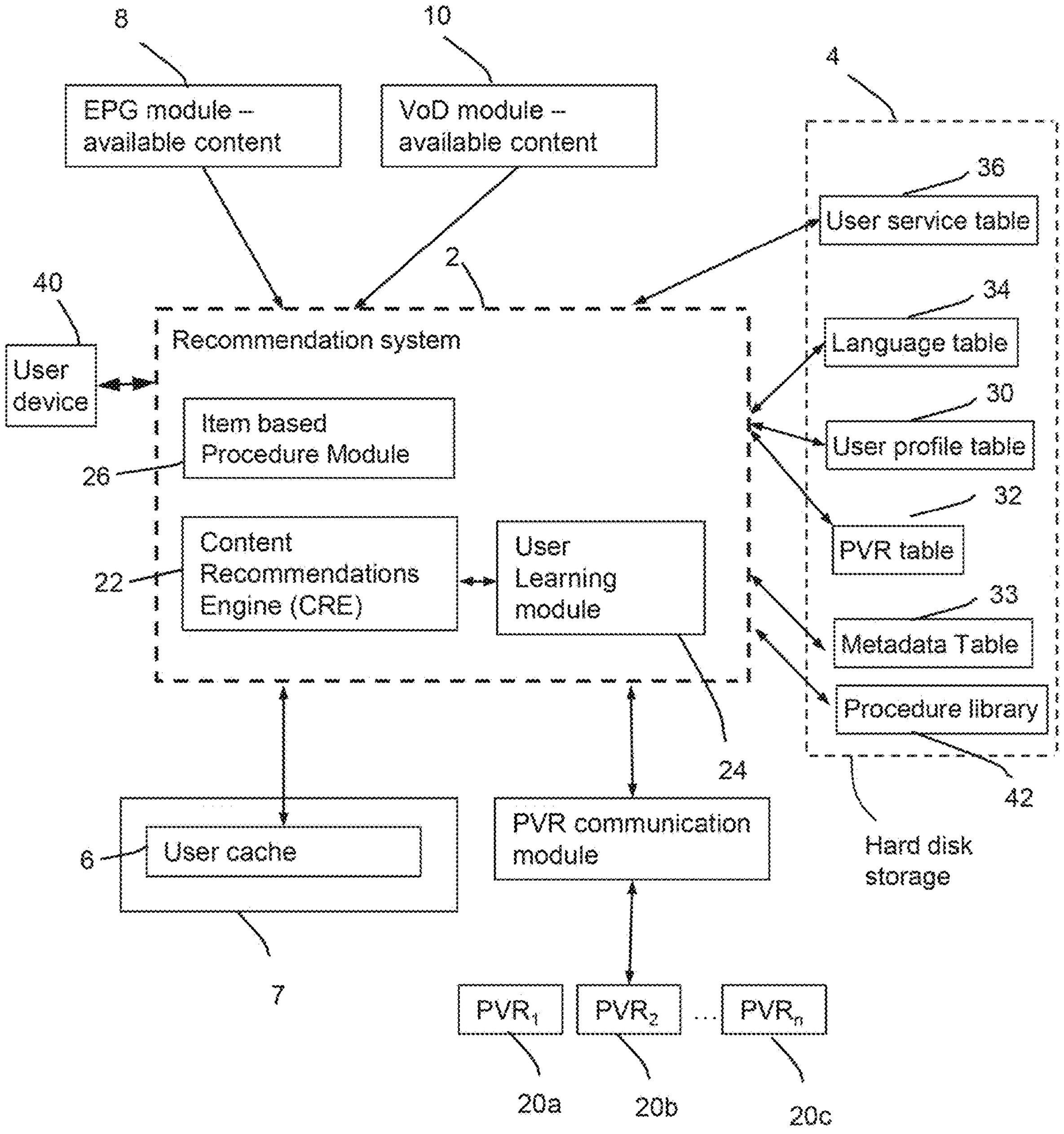
FIG. 1 is a schematic diagram of a digital content recommendation system.

FIG. 1 shows a schematic diagram of content recommendation system according to an embodiment, which is operable to generate content recommendations for users based on first party data in the form of, for example, user actions performed in relation to their selection, viewing and other actions in relation to TV content provided by a TV distribution system, and/or in relation to other content. The content recommendation system is configured to perform one or more content recommendation methods, in accordance with embodiments, including the methods described with reference to FIG. 3.

Content recommendations may be provided in real time or near real time for many thousands, tens of thousands or even hundreds of thousands or more users, for example using techniques as described in UK Patent No. GB 2574581 or U.S. Pat. No. 11,343,573, the content of each of which is incorporated herein by reference.

Some example modes of operation are described below in relation to PVRs associated with users, but content may be provided or accessible via any suitable devices, for example set-top boxes, smartphones, PCs or tablets or any other suitable content delivery mechanism.

The system in the embodiment of FIG. 1 comprises a content recommendation system 2 that comprises a content recommendation engine (CRE) or module 22 and linked to a first storage resource in the form of a hard disk storage device 4, which is used to store various user data. The recommendation system 2 is also communicatively linked to a second storage resource in the form of a local storage device that includes at least one cache, for example a user cache 6. In the embodiment of FIG. 1 the local storage device is in the form of RAM 7 but any suitable storage device may be used in alternative embodiments. The user cache 6 may be used for temporary storage of user data obtained from the hard disk storage device 4 during a user session.

As discussed further below, the recommendation system is able to communicate, either directly or indirectly, and either via wired or wireless connection, with very large numbers of users or user devices and to provide recommendations for or derived from such users or user devices. Other than some PVRs which are shown schematically in FIG. 1, only a single user device 40 is shown in FIG. 1 for clarity.

The recommendation system 2 is also linked to sources of information concerning available content, in this case an EPG module 8 and a Video-on-Demand (VoD) module which provide information concerning content available to a user via an EPG (for example, scheduled TV programmes on a set of channels) and via a VoD service. In alternative embodiments, a variety of other sources of content may be available as well as, or in addition to, EPG and VoD content, for example internet content and/or any suitable streamed content via wired or wireless connection.

In the embodiment of FIG. 1, the EPG module 8, the VoD module 10, the recommendation system 2, the User Cache 6, the PVR Communication module 12, the EPG module 8 and the User Learning module 24 are implemented in a server. The server includes communication circuitry that enables communication between the server, or appropriate components of the server, with each of the user devices, and with the content sources, for example, a TV service operator or other content service operator.

Module 26 is an item based recommendation procedure module. The module 26 is in communication with the procedure library 42 stored on hard disk storage. The procedure library may store a plurality of callable procedures. A procedure will be understood as a sequence of actions or instructions to be performed. The procedure will be understood as a functional block that receiving an input and outputs an output based on the sequence of actions or instructions.

It will be understood that the procedures may be any type of executable set of instructions or rules for generating or handling content recommendation candidates. For example, the procedures may be in the form of methods, routines, subroutines, functions, programs, subprograms or similar. The procedures may also be referred to in general as data processing operations or each procedure may comprise a sequence of data processing operations. While FIG. 1 depicts the RCE and module 26 separately, it will be understood that the module 26 may form part of the RCE, in some embodiments.

It will be understood that requests and results may be communicated between different parts of a network using one or more application programming interfaces (APIs). The API defines the parameters and other data to be included in a request and the form and format of the results from the request. In particular, the content recommendation procedures described in the following are available through one or more APIs.

The item based recommendation procedure module is configured to execute at least one item based content recommendation procedure during a content recommendation session.

Module 26 is an item based recommendation procedure executing module. The module 26 is in communication with the procedure library 42 stored on hard disk storage. The procedure library 42 stores a plurality of callable procedures that are available during a content recommendation session. In particular, the plurality of procures include one or more item based recommendation procedures. Each procedure will be understood as a sequence of actions or instructions to be performed. A description of types of procedure that may be available is provided with reference to FIG. 4. Each procedure may be understood as a functional block of executable code that receives an input and generates an output based on the sequence of actions or instructions. The procedure-executing module is configured to execute one or more procedures selected from the plurality of procedures.

It will be understood that the procedures may be any type of executable set of instructions or rules for generating or handling content recommendation candidates. For example, the procedures may be in the form of methods, routines, subroutines, functions, programs, subprograms or similar. The procedures may also be referred to in general as data processing operations or each procedure may comprise a sequence of data processing operations. While FIG. 1 depicts the RCE and module 26 separately, it will be understood that the module 26 may form part of the RCE, in some embodiments.

Any other suitable implementation of the EPG module 8, the VoD module 10, the recommendation system 2, the CRE 22, the user cache 6, the PVR communication module 12, the EPG module 8 and the user learning module 24 may be provided in alternative embodiments, for example they may be implemented in any software, hardware or any suitable combination of software and hardware. Furthermore, in alternative embodiments, any one of the components as described in relation to the embodiment of FIG. 1 or other embodiments may be combined with any other one(s) of the components, or any one of the components may be split into multiple components providing the same or similar functionality.

The EPG module 8 and the VoD module 10 obtain information concerning available content from the content sources, for example, a TV service operator or other content service operator. The content information comprises metadata of content, for example, television programme metadata. The metadata may be representative of a variety of different content parameters or properties, for example but not limited to programme title, time, duration, content type, programme categorisation, actor names, genre, release date, episode number, series number. It is a feature of the embodiment that the metadata stored at the EPG module 8 and the VoD module 10 may also be enriched with additional metadata, for example by the operator of the system, such that additional metadata to that provided by the content sources or other external sources may be stored.

In the embodiment of FIG. 1 the system operates together with three sources of content for a user device: real-time linear television, for example terrestrial or satellite broadcast television; one or more video-on-demand (VoD) services, and pre-recorded video content stored on one or more personal video recorders (PVR). In alternative embodiments, further sources of content as well as or instead of those shown may be used.

The operation of the digital content recommendation system is controlled by the recommendation system 2. As can be seen in FIG. 1, the recommendation system 2 is configured to communicate with the one or more content information modules: the electronic programme guide (EPG) module and VoD module 10. The recommendation system 2 is also configured to communicate with the user cache 6 local to the recommendation system 2, the hard disk storage resource 4 and the one or more PVRs. A data access layer provides a communication interface between the recommendation system 2 and the hard disk storage resource 4. A personal video recorder (PVR) communication module 12 provides a communication interface between the one or more PVRs 20*a*, 20*b*, . . . 20*z* and the recommendation system 2.

The recommendation system 2 has a content recommendation engine (CRE) 22, item based procedure executing module 26 and a user learning module 24. The CRE 22 can apply a set of processes or procedures to determine, in real time, content recommendations for a user based on user data and available content.

The user learning module 24 receives data indicative of selections or other actions by a user and builds up a set of user data, for example comprising or representing a user history or profile, which is stored in the hard disk storage 4, and which is used in generating personalised recommendations for the user.

FIG. 1 shows a user action being received by the recommendation system 2. In addition to receiving requests for recommendation, the recommendation system 2 is configured to log user activity. By logging user activity and storing activity over an extended period of time, the recommendation system 2 and the hard disk storage 4 can build up an overall picture of the viewing activities, habits and preferences of a plurality of users. User actions are turned into learn actions by the user learning module 24 to be processed the content recommendation engine 22.

The system of FIG. 1 is configured to operate with a plurality of user devices each associated with at least one user. The plurality of user devices may comprise a large number of devices, for example thousands, tens or hundreds of thousands, or even millions of devices. Each user device may be any device or combination of devices that is configured to enable a user to view or otherwise consume content. For example, each user device may be an internet-enabled device and/or a device for providing video or other content on demand and/or a device capable of receiving a real-time linear television broadcast signal. The user device may be a mobile device, for example a tablet, a smart phone or a laptop. Alternatively, the user device may not be mobile, for example, an internet browser enabled computing device, a smart television or a set-top box. The user device may also have an in-built or associated PVR for recording and storing content in some embodiments.

The user may be a viewer of the user device. Alternatively or additionally, the user may be a subscriber and/or customer of a service accessible through the user device.

The user cache 6 is coupled to the item based recommendation procedure module 26 and the content recommendations engine 22, and data stored by the user cache 6 may be used by the item based recommendation procedure module 26 and the content recommendations engine 22. The recommendation system 2 can access data stored on the user cache 6. The user cache 6 may be provided in random access memory (RAM) 7.

The hard disk storage 4 is communicatively coupled to the recommendation system 2. The hard disk storage 4 stores data for use by the recommendation system 2. The hard disk storage 4 is configured to store one or more databases. Entries from the databases on the hard disk storage resource 4 can be retrieved by requests made through a data access layer. Entries in the databases may also be updated via the data access layer.

The database(s) at the hard disk storage 4 store user data that is used by the CRE 22 to generate content recommendations. In the embodiment of FIG. 1 a set of database tables is provided that store information concerning the users.

In the embodiment of FIG. 1, the tables may include at least one user service table 36 that represent user service requirements, and at least one user profile table 30 that includes user attribute data that may be considered to represent a user profile. A user profile may include, for example, the following attributes: unique identifiers, for example a user identifier, a subscriber identifier, an anonymous session identifier; one or more unique geographic identifiers; a flag indicating whether or not the user has a PVR; a flag indicating whether or not the user is in debt; a flag indicating whether or not the user has opted out of receiving marketing material; one or more codes indicating one or more preferred languages of the user; a flag indicating if the user has opted out of receiving personal recommendations; the age of the user; the name of the user and the gender of the user.

In the embodiment of FIG. 1, the tables may include various user learning tables that include data representing for example the viewing activities, habits and preferences of each user. The user data can include data representing for examples explicit ratings given by a user to a particular programme or other item of content. It is a feature of the embodiment of FIG. 1 that the user data also includes data representing actions, for instance viewing actions, taken by a user.

For example, if a user selects a programme or other item of content and views or otherwise consumes it for greater than a threshold period of time then a learn action is generated and at least one user data item for that user is stored in at least one of the tables. The data item may include various data including for example start and stop viewing time, time slot identifier, programme identifier, at least some metadata concerning the programme (although such metadata may be stored separately as content data rather than user data in some embodiments, and linked to or otherwise accessed if required, for example by the programme name or other identifier). The user learning module 24 determines whether user data should be stored in the tables in respect of a particular user action or set of actions. For example, if a user only views a programme for a very short period of time, for instance if they are channel surfing, then user data is not stored in the user learning tables in respect of that action. User data can be stored in respect of a variety of different user actions or events, for example selecting, viewing, recording or searching for content.

In the embodiment of FIG. 1 it can be understood that a large part of the user data comprises user history or user action data that represent user actions over a significant period of time.

In various embodiments, there is a limit to how long user data is kept or used. For example in the embodiment of FIG. 1 after a threshold period, for example six months after being collected, items of user data are deleted. Thus, in some embodiments the user data for a particular user may include only relatively recent user action data, although the amounts of data may still be substantial.

In the embodiment of a FIG. 1, a distinction is made between different types of user and different sets of the tables are stored for the different types of users.

FIG. 2 is a representation of certain database learning tables stored on the hard disk storage resource 4 of the embodiment of FIG. 1. The system supports different categories of user. The tables of FIG. 2 correspond to different categories of user. The categories in this embodiment are: customer, subscriber and anonymous. Subscriber can, for example, refer to combined subscriber mode or time-slot subscriber mode. Anonymous can, for example, refer to cookie and/or session modes.

A customer may be a user who uses a service or content source. A customer profile may store one or more of the following attributes in some embodiments: preferred features; indication of preferred viewing times e.g. day, start and end times. The customer profile table also stores a list of the favourite content item group information: content source (e.g. EPG or VOD) and unique identifiers for content item groups.

A subscriber may be a person who has subscribed to a particular service rather than the individual who is using the service. For example, the subscriber can be an account holder or an entity that represents a household. Individual users may be associated with a subscriber. There are at least two modes of operation of subscriber profiles. The first is combined mode, where data for the subscriber (for example attributes and/or subscriber actions) are used to generate content recommendations. In that case, the content recommendations may be based on attributes and/or user actions for a plurality of individuals associated with the same subscription, for example different members of the same household. The second is time-slot mode where content recommendations are generated in dependence on the particular time slot in question. For example user data generated for a particular time slot may be used selectively in generating content recommendations for a particular time slot (potentially with user date generated for other times slots being ignored or weighted to be of less significance) and/or with different rules and/or attributes being used for different time slots. For instance, there may be a rule that no adult content be recommended for morning or afternoon time slots, only for late evening or night-time time slots. Similarly, greater weighting may be given to children's programmes for certain time slots, for instance late afternoon time slots, making recommendations of children's programmes more likely during those time slots.

Anonymous profiles are used to recommend content when neither the individual customer or subscriber to a service is known. For example, for a web user who has not logged in is an anonymous user. There are two modes of operation of anonymous profiles. These are session mode (either single-session or multi-session mode) and cookie mode.

In single-session mode preferences of the anonymous consumer are stored in memory for the duration of a single session and then removed from memory at the end. In multi-session mode preferences of the anonymous consumer are kept in memory over more than one session. The anonymous profile is identified over more than one session using a unique session id stored in the anonymous profile.

In cookie mode, the recommendations engine 22 can perform anonymous session tracking using cookies, wherein on a first request a cookie containing the unique identification is added and in later sessions used to identify the anonymous user. This works in a web environment. A cookie session profile holds a list of cookies that are known to the system together with data referring to when the cookie was created or last accessed.

For each user of all categories, there may be separate groups of learning tables. In FIG. 2, the learning tables shown are "learned language", "exclude content group", "content item ratings", "feature ratings" and "watched episodes". These tables are shown by way of example. Other tables may also be stored in the embodiment of FIG. 1. Each user may have explicit preferences and implicit preferences. Explicit preferences are information the consumer tells the system by, for example, by entering a questionnaire. Implicit preferences are information learned by the system through user actions. Data corresponding to user actions for the purpose of learning are stored in the learning tables.

The learned language table 32 stores data relating to audio languages of content items that have been user actioned by the user. For example, the feedback table can store learned language information, the date at which the language was learned and an indication of whether or not the entry has been aged out.

The exclude content group table stores data corresponding to content explicitly excluded by the user. For example, the feedback tables also contain information on content items and content item groups that have been manually excluded by the customer. For example, for individual content items that have been excluded this information includes: identifier of the content item; content source; data and time of exclusion; series title of content item; client type ID (e.g. web, call centre, set-top box). For content item groups, this information includes: customer identifier, time and date content item group excluded; content source; client type ID. In both case, a flag is included that indicated whether or not the exclusion has been aged out.

The content item ratings table stores data representing features of content such as the features, actors, channels. Feature ratings allows learn actions to specify features of content information instead of the content item. A customer is capable of applying ratings to a content item. Rating information is stored in the customer feedback table and includes: time and date rating given; customer identifier; activity identifier; name and identifier of content item rated; content item group identifier if content item associated with a content item group; rating value; a scaled rating value; feature ratings; content source ID; client type ID; series title of content tem and content item instance identifier. A flag is also stored to indicate if a recommendation has aged out or not. A feature rating made by a customer can also be stored on a specific list of features and/or sub-genres.

The watched episodes table stores data corresponding to last actioned episode of a series actioned by a user. For example, for each customer the episode history for customers is stored. This includes a series identifier; a series title; a season and episode number, and the date and time the user action occurred.

In alternative embodiments, different data tables or combinations of data tables may be stored.

It can be understood from the description above concerning user learn actions that in a system with a large number of users, user data may be generated almost continuously as users watch programmes and perform other actions. Such user data is stored in the hard disk storage 4.

It can be understood from the description of the nature of the user data, that for a particular user there may be large numbers of individual data items for each user, for example there may be individual data items for each individual relevant user action over the preceding 6 months or other predetermined or selected time period. For example each learn action (e.g. each time a user has watched or recorded a programme at any time during the previous six months or other relevant time period) will have its own data item (e.g. table entry) in the user data. Thus there may be several hundreds or even thousands of data items (e.g. table entries) that need to be read from the hard disk storage 4 for a particular user.

It is a feature of the embodiment of FIG. 1 and at least some other embodiments that during a session for a particular user, the user data for that user may change or be added to. For example, a user may carry out a number of user actions. These may include, for example, switching channel or selecting new content items, watching a content item, pausing a content item, logging in and out of the service, recording of a content item on a PVR or other recording device, or even selecting a piece of content based on a content recommendation provided earlier in the content recommendation session. User actions are logged by the recommendation system 2 during the session. Some of these user actions are recorded as learn actions during the session. As discussed, the user learning module 24 has a set of rules for determining which user actions are learn actions.

A learn action may be based on an indication that a user has watched a content item for a specified period of time. The information may be used as an indication of user preferences. As discussed, a minimum event time filter may be implemented to ensure that short period events are not recorded and/or used. In this case, a learn action is only generated if an event exceeds the minimum event time filter. In addition, there may be a rule that only one learn action for each content item should be generated. For example, a viewer may watch a programme and switch channels during an advert break and then return to the original programme. In such an event, only one learn action may be generated according to some embodiments.

New user data, for example new table entries, corresponding to the learn actions for the user ultimately are stored in the hard disk storage 4. However, it is a feature of the embodiment of FIG. 1 and of at least some other embodiments that user data for the user stored in RAM 7 during a session for that user is updated, based on the learn actions for the user occurring during the session, on an ongoing basis. Thus, the user data for a user stored in RAM 7 may change during a session for the user, such that processes are performed based on the most up-to-date user data.

In the embodiment of FIG. 1, the user data for a user is overwritten by the user data stored in RAM 7 (which may be more up-to-date) in response to the end of a session for the user. For example, the updated user data can be provided to the hard disk resource 4 in response to an expiry event. An expiry event may be a user action corresponding to a user terminating a session, terminating watching a content item (e.g. the end of a programme playback) or terminating recording of a content item. Alternatively an expiry event may occur a pre-determined period of time after a user action. For example, an expiry event may be a pre-determined period of time elapsing after a user action corresponding to a user commencing a viewing session.

In some embodiments, all of the user data for the user stored in the hard disk storage 4 may be overwritten by the user data stored in RAM 7. Alternatively, only changes to the user data may be written from RAM 7 to the hard disk storage 4. In some embodiments user data is written to the hard disk storage 4 periodically or in response to at least one of processing capacity or communication capacity being available. Higher priority may be given to updating the user data in RAM 7 than to updating the user data in the hard disk storage 4.

In some embodiments, the user data for a user may be maintained in RAM 7 after the end of a content recommendation session for the user and only deleted from RAM 7 in response to the user data from RAM 7 having been written to the hard disk storage 4.

In at least some other embodiments, each time new user data is generated (for example, when a learn action is generated during a session for a user) it is written both to RAM and to the hard disk storage 4. Thus, an attempt may be made to maintain up-to-date user records for the user in parallel in both RAM and the hard disk storage 4. For example, one option is to provide the updated user data to the hard disk storage 4 at substantially the same time as updating the user data in the user cache 6. Alternatively, priority may be given to maintaining up-to-date user data in RAM 7, with the user data in the hard disk storage 4 only being updated on an as-and-when basis.

Information relating to content available on a real-time linear television broadcast may also be received by the user device and is typically presented to a viewer via an electronic programme guide. The electronic programme guide is interactive. The information relating to the real-time linear television broadcast may be provided by either the service provider or by a third-party content information provider. The information may be delivered to the user device as part of the broadcast or may be provided through alternative means. For example, an internet enabled set-top box may receive a satellite broadcast carrying the content but receive information relating to the broadcast via an internet connection.

The user devices of the system of FIG. 1 comprise or have associated with them local storage devices in the form of PVRs, and each PVR may be considered to represent a content source. Each user may have a PVR for recording broadcasted content and/or for downloading and storing previously broadcast content. The PVR may be part of a user's set-top box or it may be a separate device. The recorded content is stored on a memory of the PVR to be viewed at a later time. FIG. 1 shows a set of n personal video recorders: $PV_1$, $PV_2$, . . . , $PV_n$. Each PVR corresponds to a different user. Each PVR has a collection of content recordings stored on their respective memories. Typically each PVR will have a different selection of stored programmes from the other PVRs. However, more than one PVR may have one or more common programmes stored on their memories at a given time. For example, user of $PVR_1$ and user of $PVR_2$ may have recorded or downloaded the same content item or series of content items.

Each PVR may have content items that are not available from other content sources, for example because they are not made available on VoD or have not been re-broadcast. This may also be a result of the age of the content item. For example, the content item may have been available for a certain amount of time from another content source but is no longer available.

In alternative embodiments, the PVRs or other data stores for storing content for users may be implemented in forms other than local storage devices. For example, the data stores may be implemented as storage areas in a cloud storage system or other networked, remote, and/or virtual storage system.

The PVR communication module 12 of FIG. 1 is an interface between the PVRs 20*a*, 20*b*, . . . 20*z* and the recommendation system 2. The recommendation system 2 collects identifying information relating to the content items stored on the PVRs 20*a*, 20*b*, . . . 20*z*. Content items from the PVR of the user can then be taken into consideration in generating content recommendations.

In alternative embodiments, any other data stores, for instance local storage devices, for example any storage devices included in or associated with user devices, may be used as well as or instead of PVRs. In some embodiments, the data stores may comprise data stores forming part of a cloud storage system or other remote and/or networked and/or virtual storage system. Furthermore, the items of content in question are not limited to comprising video content and may comprise any suitable type of content, for example audio content, image content, virtual reality content or augmented reality content.

There is description above concerning metadata or other content information that may be used by the system. Content information may, for example, include contain scheduling information (e.g. start and end times for programmes, series information) together with content information regarding the programme itself (e.g. programme description, age rating information).

Content items, for example programmes, that are scheduled in an electronic programme guide have associated content information (metadata). Information about content available from this source is stored in the EPG content source table. In a similar fashion to EPG content items, information for video on demand (VOD) content items are stored on the VOD module 10. EPG content items and VOD content items sharing certain characteristics can be arranged into groups. In addition to above, content items are stored on PVRs and have associated information. A group of EPG content items may be considered as equivalent to a broadcast television channel. VOD content items can be grouped into logical groups, for example, movie categories. VOD content item groups can be used to enable or restrict access to content items on a per customer basis. PVR content information is collected and stored in the PVR table 32.

For each content item group, either EPG or VOD, the information that is stored may include: an identifier for the group; a name for the group; a flag indicating if the group is free to view and therefore available to all customers; an indicator of video format of the group e.g. unknown, standard definition, high definition and 3D; one or more language labels; primary and secondary geographic area information. Concerning VOD content item groups, the primary and secondary geographic information can be used to allow customers from different countries access to different content. If the group is associated with a channel then an identifier and mapping to the channel may also be stored. One or more content item groups can be associated with a channel number.

Single content items (e.g. programmes) also have associated information and characteristics. Stored content item information can be constant or variable. Constant content item information has values that are the same for all instances of the content item. Variable content item information has values that vary between different instances of the content item. For example, the same episode may be shown at two different times. The two instances of the same episode share constant characteristics, such as duration and rating but different schedule times, for example.

Constant content item information includes: a unique identifier; duration of the content item; the certificate of the content item e.g. the age rating; the year the content item was released; the critic rating for the content item; the original audio language for the content item; the season and episode numbers; series title information and/or identifier; content item description, and a primary language. The primary language may or may not be the same as the original audio language. For multi-language content items, translations of the title and description can be stored. Furthermore, available broadcast language information can be stored and an indicator to indicate the type of language available. For example, the language may be primary audio language, dubbed audio, subtitled and/or signed.

Further information stored for content items includes: genre and sub-genre information and names associated with the content item. A given name can be associated with, for example, an actor or director involved with or appearing in the content item. For a given name associated with the content item, an identifier for the role in the content item is also stored. In addition, an indicator of the rank of importance of the name and/or the role in the content item may be stored. The rank may be high for a more important role in the content item. For example, a given actor playing a leading part would be assigned the highest rank available.

Although the system of the embodiment of FIG. 1 includes hard disk storage 4 and RAM 7, any suitable other memory devices or types of storage may be used as well as or instead of the hard disk storage 4 and/or RAM 7 in alternative embodiments.

Figure 3:
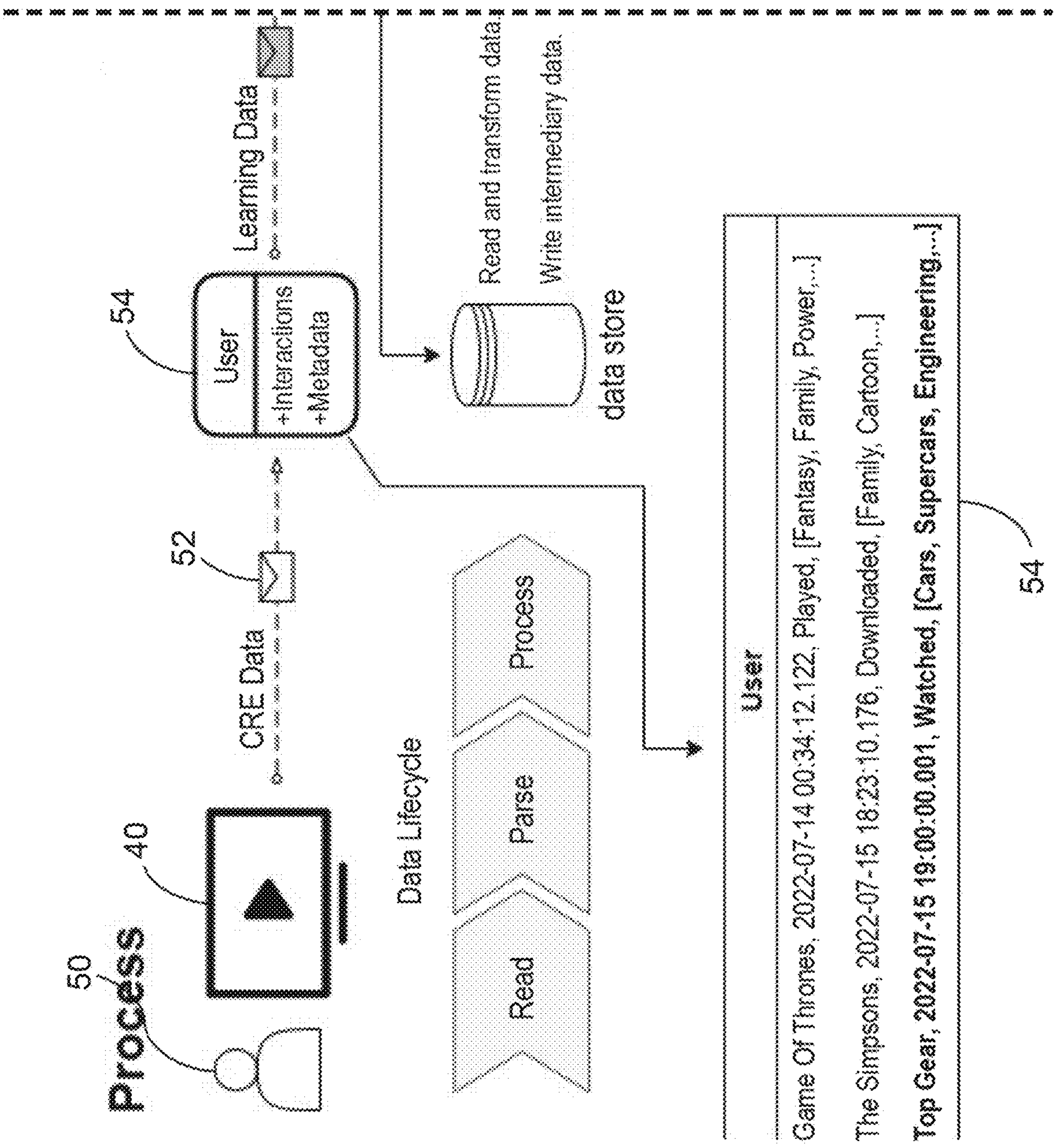
FIG. 3 is a schematic illustration of a content recommendation method using the system of FIG. 1.
Figure 3:
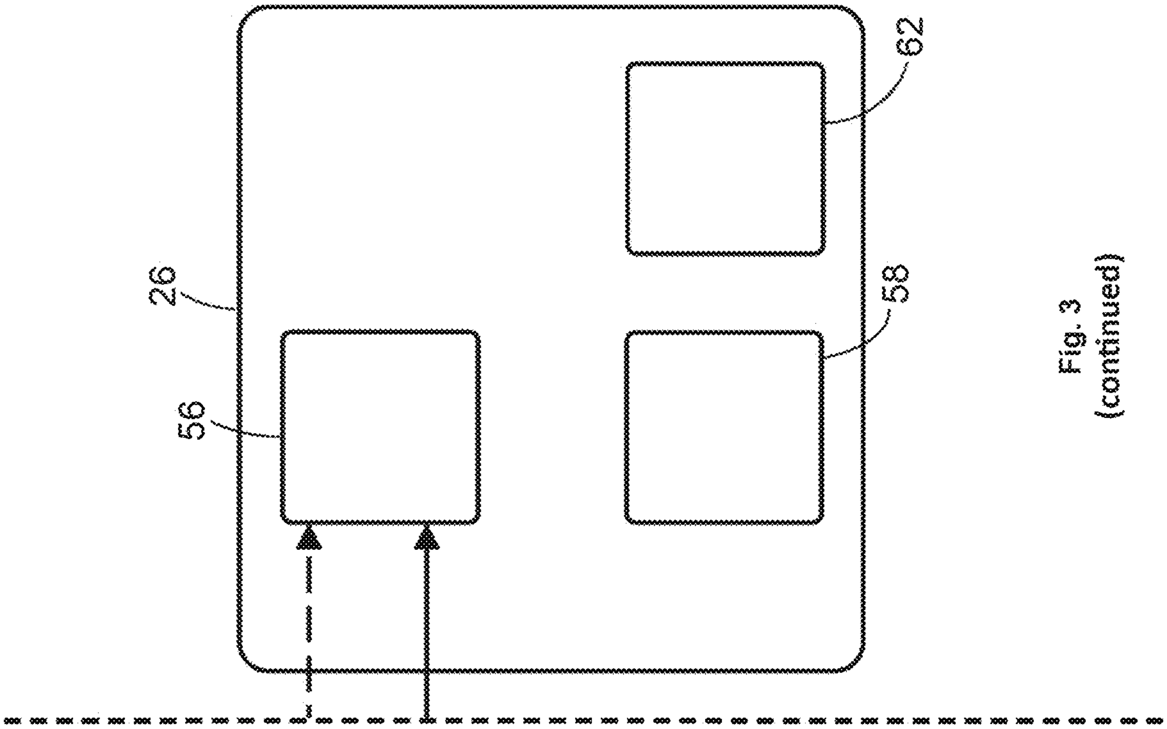

FIG. 3 is a schematic overview of the operation of the content recommendation engine. As part of a session, the content recommendation engine is configured to offer a number of operations to be called using an API. As an example, the content recommendation engine is configured to offer to content recommendation request FIG. 3 shows a user 50 watching a television programme that they have selected on user device 40. Data 52 representing the user's activity is sent to the recommendation system 2 and a learn action, as mentioned above, is performed that results in at least one user data item for that user being added to at least one of the tables. The user data item may comprise data concerning the item of content and data concerning the viewing, for example start and stop times for the viewing.

The collection of data items stored in the tables concerning the user, for instance, viewing of content by the user may be referred to as a user record for the user.

A user record 54 for the user is illustrated schematically in FIG. 3. An expanded version of at least part of the user record is also shown in FIG. 3 for purposes of illustration. In this example, the user has performed actions in relation to three items of content. In particular, the user has played an episode of Game of Thrones on 14 Jul. 2022, has downloaded an episode of The Simpsons on 15 Jul. 2022, and has just watched an episode of Top Gear on 15 Jul. 2022. Some of the metadata associated with each item of content in the record is shown in FIG. 3. For example, at least the meta data items cars, supercars and engineering are associated with the Top Gear episode. In practice there will be many more items of meta data associated with each item of content.

In general, a user record 54 will include records of far larger numbers of items of content than shown for the purposes of illustration in FIG. 3. However, such a small number of items content might be found for a new user or for a temporary user of a system. For example in some embodiments, the system may be used for a user who is a guest in a hotel or traveller in a vehicle or transport system.

The user data in respect of the user 50 is sent to the content recommendation engine 22 in order to generate or update a user profile for the user 50.

The content recommendation module 22 in this embodiment then performs a search of various data sources 56, for example in the cloud, to determine any other information concerning the item of content. For example, various databases can be consulted that include additional information concerning television programmes or other items of content.

In the present embodiment, the record for the item of content and any other information found from the search of data sources 56 is subject to processing by sub-module 58 that match the meta data and other information for the item of content to an ontology of meta data terms that are maintained by the system. Thus, the meta data for the item of content can be enriched, corrected or supplemented.

In the present embodiment the ontology consists of around 38,000 features that can be used as meta data to represent items of content. The ontology defines features in the format <context>: <keyword>. Features describe the content and include subjects, settings, themes and characters (for example, Wimbledon may contain the terms-subject: tennis, sports competition: Wimbledon, theme: sports). Any other suitable ontology can be used in other embodiments. In some embodiments, no ontology is used and the raw metadata associated with the item of content (for example, provided by the content maker, distributor or broadcaster) is used without amendment or enrichment.

The metadata for the item of content is stored in the user record in the hard disk storage 4.

As described above, each user has a stored user record or user profile. The system is configured to provide a plurality of content recommendation candidates to a user based on the similarity between the user record and the content metadata.

Operation of the system of FIGS. 1 and 3 is described in the following. As a first stage, the user 50 initialises a viewing session through a first initiation event. An initiation event can, for example, be a user logging on to a service provider or turning on the user device. The initiation event is communicated to the content recommendation module 2 via a communication channel between the user device 40, for example a set top box or other device, for example at the user's home or other remote location, and the content recommendation module 2. In the embodiment of FIG. 1 there is direct communication between the user device 40 and the content recommendation module 2. In alternative embodiments, communication between the user device 40 and the content recommendation module 2 is mediated or passes through, for example a content provider, for instance a TV system operator to which the user subscribes. The initiation event may be treated automatically by the content recommendations module as being a request for recommendations for the user.

In response to the initiation event, the user is then presented, via a display of the user device 40, with a content selection screen displayed on a display screen and/or user interface, which presents the user with a choice of viewing different content items from the content source. For an EPG content source, the content selection screen may form part of the EPG itself. For a VoD content source, a dedicated user interface may be presented. It is a feature of the embodiment of FIG. 1 that the choice of content items includes content recommendations generated by the content recommendation system of FIG. 1 and communicated to the user device. In one mode of operation it is a requirement that the content recommendations should be provided almost instantaneously, for example within a few hundred milliseconds, so that they can be included on the user interface together with other available items of content, for example live TV schedules, as soon as the user interface is displayed to the user.

In response to the initiation event a start time to the viewing session is logged by the CRE 22, for example, to coincide with the initiation event, a content recommendation session is opened and user data, associated with the user, are retrieved from storage on tables in the hard disk storage resource 4 and loaded to the user cache 6 in RAM 7. The user data are maintained in RAM 7 throughout the content recommendation session.

The CRE 22 also maintains content data in the RAM 7, for example any suitable data relating to properties of the content, such as metadata obtained from the EPG module 8 and the VoD module 10. The content data stored in RAM 7 may be updated periodically or in response to changes in the data stored, for example, at the EPG module 8 and VoD module 10. By caching the content data in RAM processing and data access speed may be increased.

Following retrieval of user data and obtaining content source information, the CRE 22 is configured to use the user data located in the user cache 6 together with the available content information as part of a content recommendation process. The content recommendation process is performed in accordance with embodiments, for example, as described with reference to FIGS. 4 and 5.

Once the CRE 22 has performed the content recommendation process, the content recommendation(s) generated by the CRE 22 are then transmitted to the user device 40 either directly or indirectly. In some embodiments the content recommendation(s) are transmitted to a database, server or other device, for example a third party device. The content recommendation(s) may be further processed and/or may be transmitted onward to then user device either immediately, at a later time or upon request. The content recommendation(s) may be transmitted in any suitable fashion either to the user device, or to the database, server or other device. In the present embodiment, software installed at the user device 40 determines whether or how the content item recommendation are displayed on the user interface.

It can be understood that the time constraints on providing content recommendations can be significant, given that personalised content recommendations may need to be generated on the fly, particularly as it may be necessary to provide personalised content recommendations for tens of thousands, hundreds of thousands, or even millions of users substantially simultaneously in the case of systems with large numbers of users and during busy periods such as peak viewing periods.

It will be understood that the CRE 22 may maintain content recommendation sessions for a plurality of the users and may maintain in the RAM user data for said plurality of the users substantially simultaneously. For example, user data may be maintained in the RAM 7 for thousands, hundreds of thousands or even millions of users substantially simultaneously, depending on the RAM storage capacity available and the number of subscribers or other users associated with the system.

At the start of a content recommendation session for a user the user data, including all of the various table entries, for the user, are read from the hard disk storage 4 and stored in the user cache 6 in RAM 7, or any other suitable local or rapidly readable storage resource in alternative embodiments. Throughout the content recommendation session the user data stored in the user cache 6 in RAM 7 is used by the CRE 22 to generate content recommendations for the user. This can provide a significant time saving compared to having to read the user data from the hard disk storage 4 each time a content recommendation is needed during the session. At the expiry of a session, the user data for the user is deleted from the cache. The expiry of the session may occur for example in response to no user actions have been received for a pre-determined time period, in response to a user logging off a session or switching off a user device, or in response to loss of communication with the user device. If a new content recommendation session for the user subsequently begins, the user data is read again from the hard disk storage 4 and stored in the user cache 6 in RAM 7.

Figure 6:
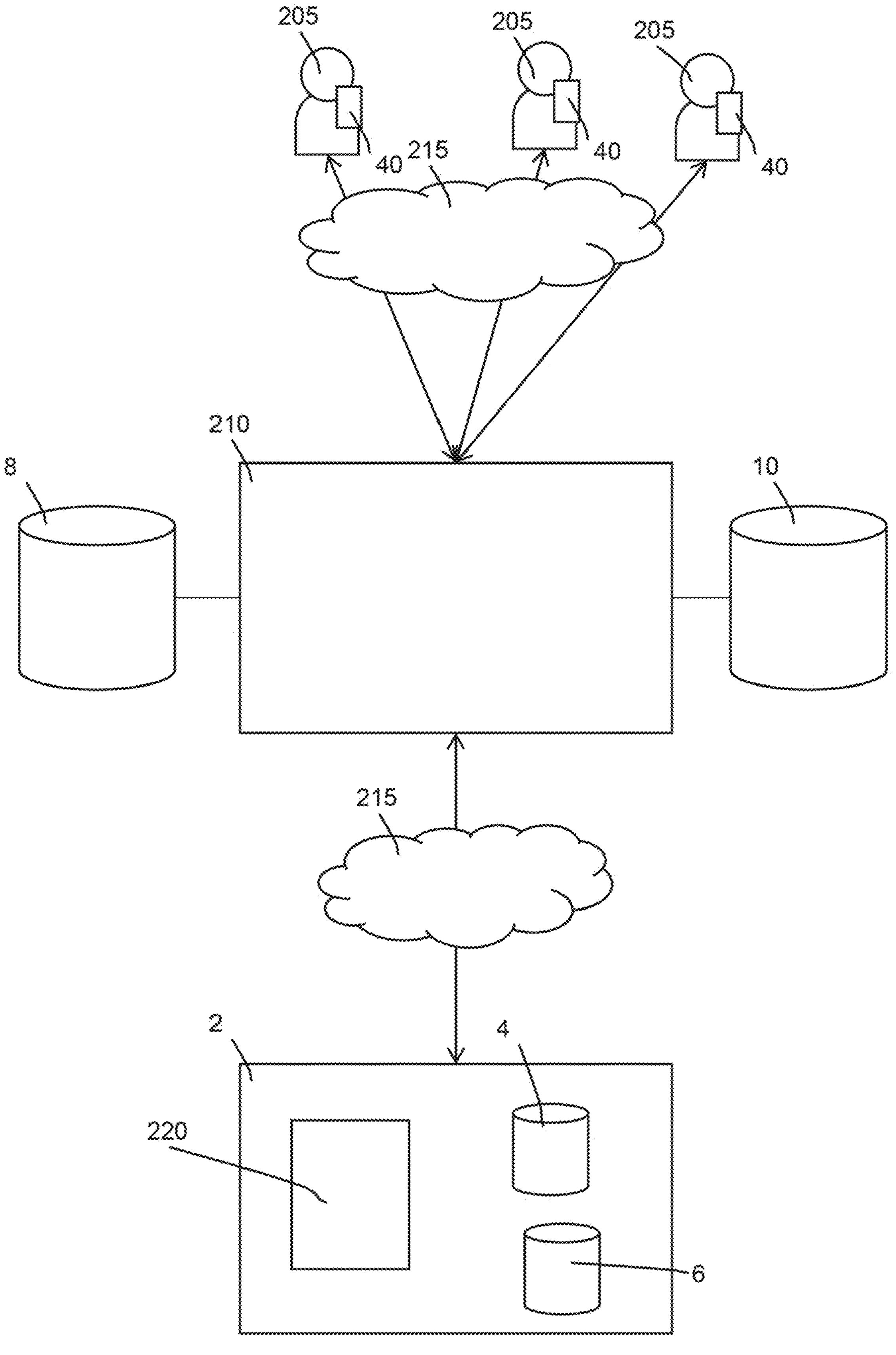
FIG. 6 is a schematic of an alternative system arrangement to that of FIG. 5.

There is description above concerning metadata or other content information that may be used by the CRE 22 in providing content recommendation, FIG. 6 shows content information made available to the content recommendations engine 22 in some embodiments. The content information can contain scheduling information (e.g. start and end times for programmes, series information) together with content information regarding the programme itself (e.g. programme description, age rating information).

In some embodiments, metadata items may be mapped from an ontology (e.g. the ontology of 38,000 items) to other metadata items in the ontology. Weightings or confidence scores are associated with the mappings in some embodiments. The ontology represents a pre-determined set of properties and/or parameters. The content metadata for content items (or as collected in user data) corresponds to properties and/or parameters selected or assigned weights and/or values from this pre-determined set. The at least one property of the piece of content may comprise a set of tags or other metadata representing properties of an item of content. In the system, the metadata is stored on hard disk storage in metadata table 33.

As part of a content recommendation session, a number of different types of recommendation procedures are available to be requested, as described above. In particular a number of procedures may be combined.

Any suitable content recommendation procedures may be combined. These include procedures, for example based on a weighting, scoring and/or matching process generated based on previous user actions, and matching to available content. In a simple example, if it is determined from the user data that a user has previously watched movies starring a particular actor, or watched football matches featuring a particular team, then the CRE 22 may produce a recommendation for the user to watch a movie or other content featuring that actor, or a programme concerning that football team, if such movie, programme or other content is currently available or will soon be available via the available content sources. It will be understood that the content recommendation procedures may be more sophisticated and, may be for example based on similarities or cross-correlations between different content parameters and user actions and properties based on large amounts of historical data. At least one of the recommendation procedures may use a machine learning derived model to determine recommendation candidates. As a non-limiting example, machine learning techniques such as clustering algorithms for clustering objects that share similarities, such as K-means clustering or neural network based techniques and/or Kohonen based techniques may be suitable.

The content metadata may correspond to values for one or more properties or parameters or characteristics, such as programme title, time, duration, content type, programme categorisation, actor names, genre, release data, episode number, series number, style, mood, language and theme. The properties or parameters or characteristic may include one or more of the following: Audience; Award; Category; Character; Character Type; Concept Source; Director; Format; Franchise; Host; Milieu; Mood; Producer; Person; Subcategory; Scenario; Setting; Sports Competition; Studio; Style; Subject; Team; Theme; Time Period; Writer. These properties or parameters will be understood as a non-exhaustive and non-limiting list. The metadata is represented by metadata items having a value for such properties or parameters. The collected metadata can be considered as representative of user interests and/or preferences based on previous interactions with the content. The metadata items may be provided together with a score so that the metadata represents a degree of the preference or interest for that content property or parameter.

The initial content metadata may be referred to as user profile features and the generated content metadata may be referred to as discovery features.

Operation of the content recommendation system to provide a context based recommendation procedure is described with reference to FIG. 4.

It will be understood that requests and results of different procedures may be communicated between different parts of the system using one or more application programming interfaces. The API defines the parameters and other data to be included in a request and the form and format of the results from the request.

While the embodiments describe combining results of different available operations, it will be understood that, from the perspective of an end user (for example, a service operator or end user) the combined operations may be combined together as a further available process (for example, as a separate API procedure). The system thus receives the request and performs the combination of operations based on the available data processing operations, in accordance with the set of rules, and returns the results.

As described with reference to FIG. 1, the content recommendation system provides a plurality of data processing procedures including an item based recommendation procedure. In accordance with an embodiment, the item based recommendation procedure includes an item based related content request. The related content request is configured to receive a seed content item and to generate content recommendations based on the seed content item. In the present embodiment, the procedure received a seed content identifier that identifies the content item from the available content item. Using the identifier, metadata for the content item is then obtained. Using the metadata, content recommendations relating to similar content items can be generated. For example, the content recommendation may include content that has one or more of the same metadata items.

Figure 4:
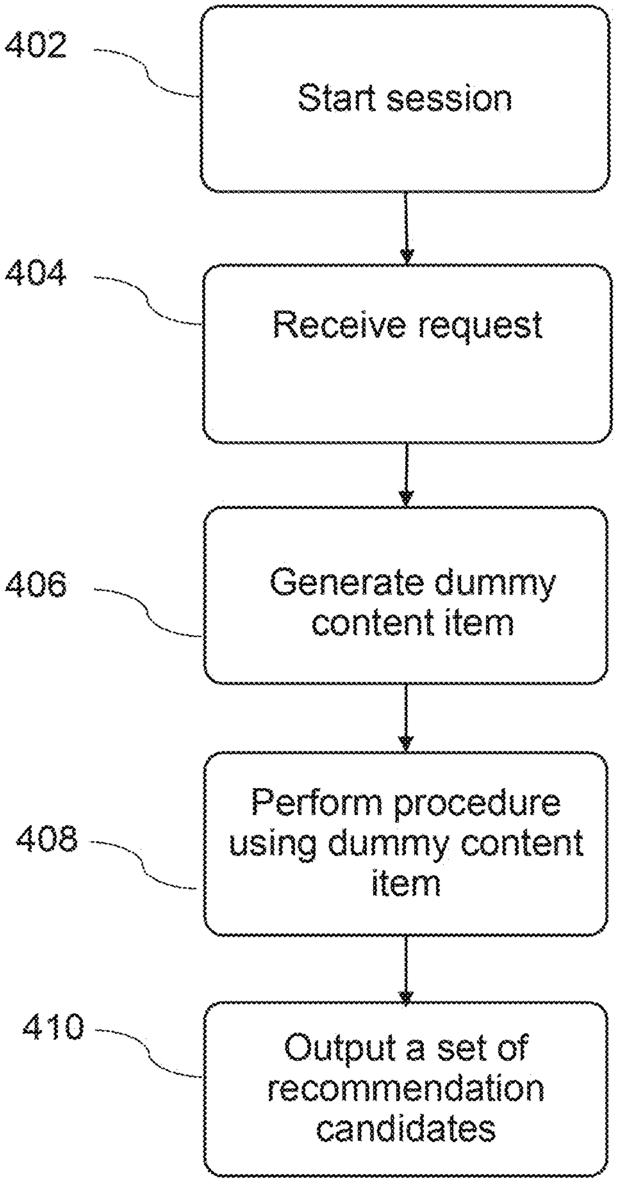
FIG. 4 is an overview of a method of generating content recommendations for a user in accordance with an embodiment.

FIG. 4 describes a method of generating content recommendation candidates in accordance with an embodiment.

At step 402, a content recommendation session is started. In the present embodiments, at least one content item based recommendation procedure including the related content recommendation procedure described above is obtained are transferred from hard disk storage to RAM 7 in response to the start of the content recommendation session.

At step 404, a content request is received for a selected user. In the system of FIG. 1, the content request may be received, for example, from the user device. The request substantially corresponds to a context based request and is represented by input data representing a desired set of one or more content attributes. The content attributes may be considered to represent a desired context.

The content attributes may also be referred to as facets. The following, non-limiting and non-exhaustive list of facets is provided:

1. Actor
2. Audience
3. Award
4. Category
5. Character
6. Character Type
7. Concept Source
8. Director
9. Format
10. Franchise
11. Host
12. Mileu
13. Mood
14. Producer
15. Person
16. Subcategory
17 Scenario
18. Setting
19. Sports Competition
20. Studio
21. Style
22. Subject
23 Team
24. Theme
25 Time Period
26. Writer It will be understood that in addition to facets, a number of other categories of content attributes may be used. For example, the desired context may be defined, at least in part, by descriptive content metadata or alternative content characteristics, such as, running time, language, format, age rating. In general, any property or parameter or characteristic capable of distinguishing a sub group of available content from other available content can be used as a content attribute. For example, metadata categories as described above or other content information may be suitable. It will be understood that a context can correspond or represented by combination of context attributes. In some embodiments, the context may be associated with at least some of the content that is currently being displayed to a user via the user device.

At step 406, a dummy content item is generated. The dummy content item is generated and then assigned metadata that corresponds to the set of desired attributes. In the present embodiment, the dummy content item is generated an instance of a content item object. It will be understood that the dummy content item does not correspond to available content item and that the dummy content item may be missing certain metadata items (for example, the dummy content item may not have entries such as "title"). The content item may be stored in RAM 7. It will be understood that the dummy content item is assigned a content item identifier to allow it to be identified by the system, in particular, during request procedure.

In some embodiments, the content attributes and/or their associated weighting are represented mathematically as a feature vector generating the content item comprises generating a dummy content item comprises assigning values to the feature vector such that the feature vector represents the desired attributes.

In some embodiments, a small number of desired content attributes are received, and the method comprises assigning further content attributes to the dummy content item than those received.

At step 408, a related content type request procedure (as described above) is performed using the dummy content item. In further detail, the procedure receives a seed content item identifier of the dummy content item and identifies the dummy content item. The procedure then performs a content recommendation request using the dummy content item, in particular, using the metadata.

At step 410, the results from procedure are output via the user device. In the present embodiment, the content recommendations candidates are output as part of the graphical interface allowing user to select one of the candidates to view or for further information.

Following completion of the procedure, the dummy content item may be deleted or discarded. In some embodiments, the dummy content item is a transitory object and is not subject to long term storage.

While the method of FIG. 4 uses a related content type procedure other item based content recommendation procedures may be used. For example, item based collaborative procedures may be used.

The set of content attributes may be obtained using a number of different methods, as described in the following.

As a first example, the content attributes may be selected from a list of possible values via a graphical user interface on user device. In such an example, a list of available attributes is provided to the user via interactive graphical elements that may be selected by a user. In one embodiment, a set of possible attributes are listed by category and, in response to selected an attribute, a list of possible values for the attribute are presented to the user via a further interactive graphical element. The possible values can then be selected by a user by interacting with the graphical user interface. Such an interface allows a user to combine different values for attributes.

In such embodiments, the recommendation candidates are displayed via a further interactive element of the display that are presented together with the selectable elements, as described above. In such an embodiment, the user can see the results of the recommendation process in response to selection and/or re-selection of candidates. In such embodiments, the method of FIG. 4, in particular, the steps 404, 406, 408, and 410 may be repeated in response to the addition and/or removal of content attributes such that new candidates are generated in response to modification of the user input. The display is then be updated to reflect the new content attributes.

In a further example, the user input device is an audio device and the user input is received via an audio input sample. The audio sample is a voice sample and is processed to extract desired content attributes and/or associated weightings. In this way, the dummy content item is generated based on a voice input. In such embodiments, the processing of the audio may include extracting parts of the audio sample and comparing said extracted parts to a known list of content attributes.

In further embodiments, the results from the content recommendation process may be further modified and/or augmented by applying one or more further operations and/or procedures to at least some of the content recommendation candidates. As a non-limiting example, in a further embodiment, a further step of personalizing the content recommendation candidates is performed. For example, user data, in the form of a user profile is obtained, and the one or more selection and/or filtering and/or ranking procedures on the one or more content recommendation candidates using obtained user data.

It will be understood that the methods described above, in particular, the method of FIG. 4, may be available for use during a content recommendation session, for example, via an application programming interface.

It will be understood that the set of content recommendation candidates is personalized, in some embodiments. In an embodiment, the dummy seed content item identifier to generate a plurality of non-personalised content item recommendations and these are sorted, filtering and/or ranking the plurality of non-personalised content item recommendations using user data. In particular, as the user data is stored in a user profile, the recommendation may be sorted using one or more features of the user data. The sorting, filtering and/or ranking of the plurality of non-personalised content item recommendations can include, for example, using content metadata or more other items of user data to identify one or more of the non-personalised content item recommendations that represent a closest match with the user data. The identifying of the closet match includes performing a comparison between metadata associated with the non-personalised content item recommendations (as returned by the initial request) with metadata associated or represented by the user data.

In further embodiments, using the dummy content item and/or identifier to generate a plurality of non-personalised content item recommendations includes the step of obtaining at least some of the metadata associated with dummy content item identified by the dummy content item identifier; and identifying related content comprising content associated with one or more of the same or similar metadata.

In some embodiments, the personalized content item recommendation candidates are presented to a user, via a user device, in an order of from closest match to least closest match.

In some embodiments the context based procedure is called in response to a selection made by a user via a content selection interface. In some embodiments the context based procedure is called by a further part of the engine, for example, in place of a context based request. In some embodiments the context based procedure is called in response one or more actions occurring as part of a content recommendations session.

In some embodiments, the item based procedure is provided inside a wrapper function for a context based procedure. The wrapper function or procedure is configured to receive the same input as an existing context based procedure (i.e. input data representing one or more content attributes that represent a desired context) and then makes an internal call to the item based procedure. The wrapper function may be configured to receive at least the desired content attributes and input. The wrapper function may be configured to receive substantially the same format of input as an existing procedure, for example, a content based procedure. The method may comprise selecting the wrapper function or the existing procedure as part of a content recommendation process.

Figure 5:
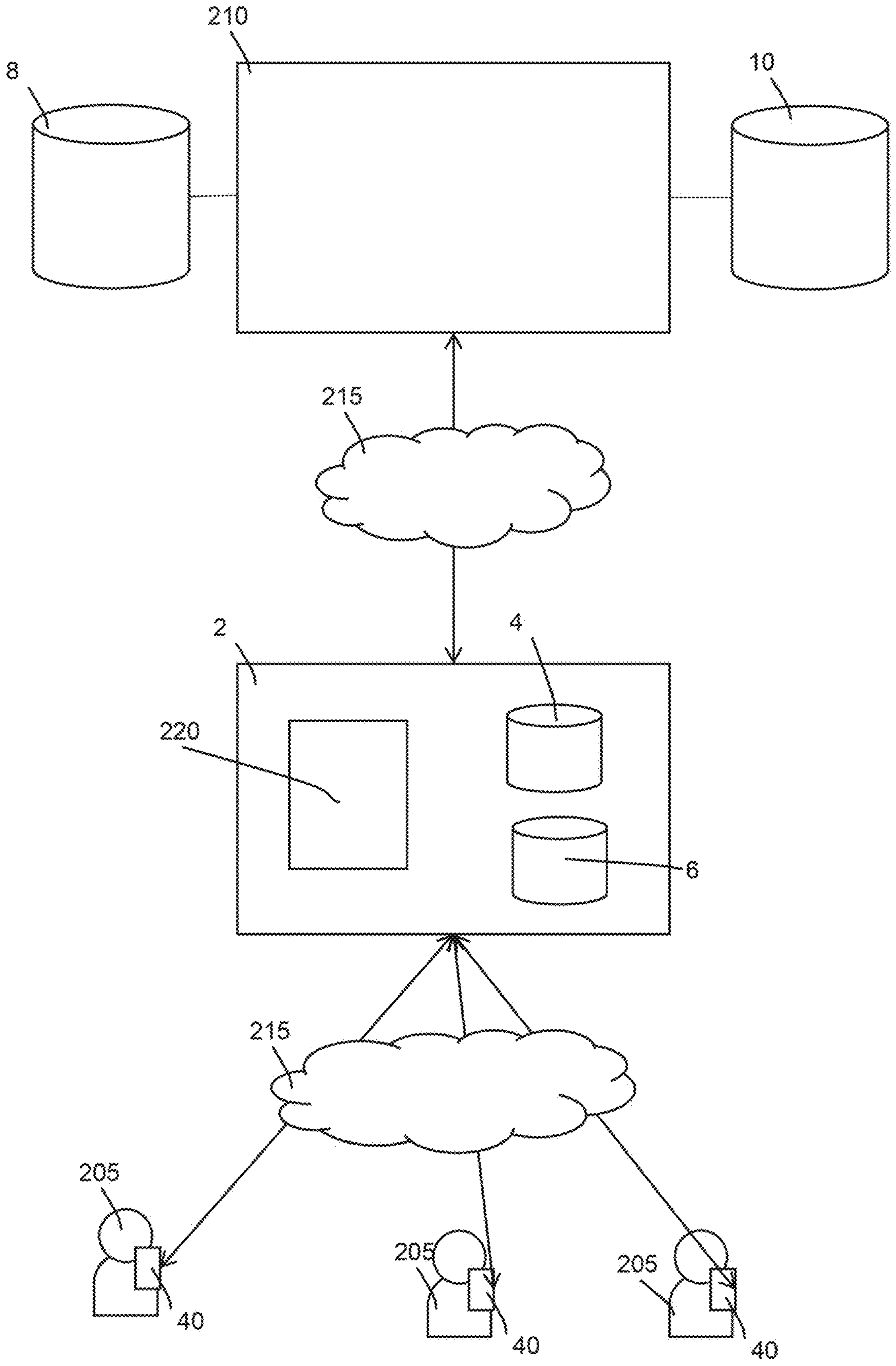
FIG. 5 is a schematic of the system of FIG. 1.

Although a particular system arrangement is shown in FIG. 1, there are various system arrangements that could be used. For example, FIG. 5 shows a "middleware" arrangement in which the recommendation system 2 sits as "middleware" between the users 205 and systems of a content provider 210. The recommendation system 2 is implemented by processing resource 220 (which may comprise one or more processors) with the storage device 4 and user cache 6. In some examples, the recommendation system 2 can be implemented by a cloud computing system, by one or more servers or other suitable enterprise level computing system. In this arrangement, systems that implement the recommendation system 2 receive data sent from the user devices 40 of the users 205 that represents the user actions/user activity taken by the user 205 that are relevant to the content selection interface, such as but not limited to actions taken by the user 205 during operation of the content selection interface, including one or more of the user actions listed above. The user devices 40 also provide a user ID that can be used to identify the user 205 to allow the provision of a content selection interface that is customized for that user 205. The user devices 40 communicate the data over a network, such as the cloud 215, to the recommendation system 2. The recommendation system 2 records the user actions in order to generate learn actions and build and update a user profile that can be used to configure and customize a content selection interface for the user 205. The recommendation system 2 can communicate the requests and other data from the user devices 40 to the content providers systems 210 in order to provide the content to the user devices 40.

Other system arrangements that provide similar functionality to customize the content selection interfaces for users are possible. FIG. 6 shows an alternative system configuration in a "backend" processing arrangement. In this arrangement, the user devices 40 interface directly with the systems of a content provider 210, which implements the content selection interface and handles the requests from the user devices 40. User interaction data from the user devices 40 is provided by the systems of a content provider 210 to the recommendation system 2 in order for the recommendation system 2 to identify learn actions and build user profiles for at least partly customizing the content selection interface for that user. The recommendation system 2 provides the data for customizing the content selection interface for that user, including an ordering with which to present at least some of the groups of content in the user selection interface, to the systems of a content provider 210 for providing in the content selection interface for that user 205.

Content items, for example programmes, that are scheduled in an electronic programme guide have associated content information (metadata). Information about content available from this source is stored in the EPG content source table. In a similar fashion to EPG content items, information for video on demand (VOD) content items are stored on the VOD module 10. EPG content items and VOD content items sharing certain characteristics can be arranged into groups. In addition to above, content items are stored on PVRs and have associated information. A group of EPG content items may be considered as equivalent to a broadcast television channel. VOD content items can be grouped into logical groups, for example, movie categories. VOD content item groups can be used to enable or restrict access to content items on a per customer basis. PVR content information is collected and stored in the PVR table 32.

For each content item group, either EPG or VOD, the information that is stored may include: an identifier for the group; a name for the group; a flag indicating if the group is free to view and therefore available to all customers; an indicator of video format of the group e.g. unknown, standard definition, high definition and 3D; one or more language labels; primary and secondary geographic area information. Concerning VOD content item groups, the primary and secondary geographic information can be used to allow customers from different countries access to different content. If the group is associated with a channel then an identifier and mapping to the channel may also be stored. One or more content item groups can be associated with a channel number.

Single content items (e.g. programmes) also have associated information and characteristics. Stored content item information can be constant or variable. Constant content item information has values that are the same for all instances of the content item. Variable content item information has values that vary between different instances of the content item. For example, the same episode may be shown at two different times. The two instances of the same episode share constant characteristics, such as duration and rating but different schedule times, for example.

Constant content item information includes: a unique identifier; duration of the content item; the certificate of the content item e.g. the age rating; the year the content item was released; the critic rating for the content item; the original audio language for the content item; the season and episode numbers; series title information and/or identifier; content item description, and a primary language to be used by the recommendations engine 22 when checking for previously recommended items. The primary language may or may not be the same as the original audio language. For multi-language content items, translations of the title and description can be stored. Furthermore, available broadcast language information can be stored and an indicator to indicate the type of language available. For example, the language may be primary audio language, dubbed audio, subtitled and/or signed.

Further information stored for content items includes: genre and sub-genre information and names associated with the content item. A given name can be associated with, for example, an actor or director involved with or appearing in the content item. For a given name associated with the content item, an identifier for the role in the content item is also stored. In addition, an indicator of the rank of importance of the name and/or the role in the content item may be stored. The rank may be high for a more important role in the content item. For example, a given actor playing a leading part would be assigned the highest rank available.

In the embodiment of FIG. 1 recommendations of items of content may be provided based on data concerning items of content of the same type (for example video content, such as movies, TV programmes or other video content), and/or based on user data representing previous consumption of, or actions relating to, content of the same type (for example video content, such as movies, TV programmes or other video content). It will be understood that video content may include associated audio content, for example an associated soundtrack.

In alternative embodiments, recommendations are generated by the CRE 22 for content items of one type based on content information or user actions concerning content of another type. The different types of content may comprise, but are not limited, to video content (for example, movies, TV programmes or other video content), audio content (for example, music, podcasts, talking books), computer games, books, magazines, other printed content, live performances such as concerts, plays, comedy performances or sporting events.

For example, if user data stored for a user, for example in the hard disk 4, indicates that a user has bought tickets or attended a live performance, for example of a musical act or sports team, then the CRE 22 may use that user data in the content recommendation process, which may increases the likelihood that the CRE 22 will recommend a movie or TV programme or other content concerning that musical act or sports team.

Similarly, if user data stored for a user, for example in the hard disk 4, indicates that the user has read or purchased a particular book then the CRE 22 may use that user data in the content recommendation process, which may increases the likelihood that the CRE 22 will recommend a movie or TV adaptation of that book or of other books by the same or similar authors or relating to the same or similar genres (for example, action, crime, romance, etc.).

In some embodiments, the content recommendation based on user actions or preferences concerning content of one type may comprises recommendations of more than one type of content. For example, a content recommendation may be based on user actions or preferences in relation to TV programmes, but the content recommendation may comprise recommendations of one or more TV programmes and, in addition, one or more items of another type of content.

Although the system of the embodiment of FIG. 1 includes hard disk storage 4 and RAM 7, any suitable other memory devices or types of storage may be used as well as or instead of the hard disk storage 4 and/or RAM 7 in alternative embodiments.

The above description of specific embodiments is made by way of example only. A skilled person will appreciate that variations of the described embodiments may be made without departing from the scope of the invention.

What is claimed is:

1. A computer-implemented method for generating one or more content recommendation, the method comprising:

opening a content recommendation session for a selected user, wherein, as part of the session, a content recommendation procedure for generating one or more recommendation candidates based on a seed content item or seed content item identifier is available, wherein the content recommendation procedure is an item based procedure configured to receive, as an input, a seed content item or seed content item identifier and output one or more recommendations corresponding to content items available via a content distribution system;

receiving, from a user device, a content recommendation request representing one or more desired content attributes;

generating a dummy content item having metadata representing the one or more desired content attributes, wherein the dummy content item does not correspond to an available content item, wherein generating the dummy content item comprises creating an instance of a content item object and assigning said metadata representing the one or more desired content attributes to the content item object;

performing the content recommendation procedure thereby to generate one or more content recommendation candidates for the desired content attributes;

wherein the performing of the content recommendation procedure comprises providing the generated dummy content item or an identifier for the dummy content item as the seed content item or seed content item identifier to the item based procedure.

2. The method of claim 1, wherein performing the content recommendation procedure comprises:

obtaining metadata associated with the dummy content item or a corresponding dummy content item identifier; and identifying related content comprising content associated with one or more of the same or similar metadata.

3. The method of claim 1, wherein the content attributes comprise any property, parameter and/or characteristic capable of distinguishing one or more content items.

4. The method of claim 1, wherein the content attributes comprise at least one of: Actor; Audience; Award; Category; Character; Character Type; Concept Source; Director; Format; Franchise; Host; Milieu; Mood; Producer; Person; Subcategory; Scenario; Setting; Sports Competition; Studio; Style; Subject; Team; Theme; Time Period; Writer.

5. The method of claim 1, wherein the generated dummy content item comprises a transitory content item, optionally, wherein the method comprises deleting the dummy content item from storage after completion of the content recommendation procedure.

6. The method of claim 1, wherein the content attributes and their associated weighting are represented mathematically as a feature vector and wherein generating the dummy content item comprises assigning values to the feature vector so that the feature vector represents the desired attributes.

7. The method of claim 6, wherein performing the recommendation procedure comprises determining a set of closest feature vectors to the feature vector wherein the recommendation candidates correspond to the determined set of nearest feature vectors.

8. The method of claim 1, wherein the method comprises receiving user input and wherein the content attributes are generated based on keywords derived from user input.

9. The method of claim 1, wherein the method comprises processing an audio input sample to extract content attributes and/or attribute weightings for the request.

10. The method of claim 1, wherein the method comprises receiving user input performing a comparison between at least some of the received user input and a stored list of attributes to determine the content attributes and/or attribute weightings.

11. The method of claim 1, wherein the method further comprises performing one or more selection and/or filtering and/or ranking procedures on the one or more content recommendation candidates based on obtained user data.

12. The method of claim 1 further comprising:

using the seed content item identifier to generate a plurality of non-personalised content item recommendations; and sorting, filtering and/or ranking the plurality of non-personalised content item recommendations using user data.

13. The method of claim 12, wherein the sorting, filtering and/or ranking of the plurality of non-personalised content item recommendations comprises using content metadata or more other items of user data to identify one or more of the non-personalised content item recommendations that represent a closest match with the user data.

14. The method of claim 12 further comprising presenting the one or more personalised content item recommendation candidates to the user in order from closest match to least closest match.

15. The method of claim 12 wherein identifying the closest match comprises comparing metadata associated with the non-personalised content item recommendations with metadata associated or represented by the user data.

16. The method of claim 1 wherein using the dummy content item and/or identifier to generate a plurality of non-personalised content item recommendations comprises:

obtaining metadata associated with the dummy content item identified by the dummy content item identifier; and identifying related content comprising content associated with one or more of the same or similar metadata.

17. A system comprising processing circuitry configured to:

open a content recommendation session for a selected user, wherein, as part of the session, a content recommendation procedure for generating one or more recommendation candidates based on a seed content item or seed content item identifier is available, wherein the content recommendation procedure is an item based procedure configured to receive, as an input, a seed content item or seed content item identifier and output one or more recommendations corresponding to content items available via a content distribution system;

receive, from a user input device, a content recommendation request representing one or more desired content attributes;

generating a dummy content item having metadata representing the one or more desired content attributes, wherein the dummy content item does not correspond to an available content item, wherein generating the dummy content item comprises creating an instance of a content item object and assigning said metadata representing the one or more desired content attributes to the content item object;

perform the content recommendation procedure thereby to generate one or more content recommendation candidates for the desired content attributes;

wherein the performing of the content recommendation procedure comprises providing the generated dummy content item or an identifier as the seed content item or seed content item identifier for the dummy content item to the item based procedure.

18. A non-transitory computer-readable medium that comprises computer-readable instructions that are executable to:

open a content recommendation session for a selected user, wherein, as part of the session, a content recommendation procedure for generating one or more recommendation candidates based on a seed content item or seed content item identifier is available, wherein the content recommendation procedure is an item based procedure configured to receive, as an input, a seed content item or seed content item identifier and output one or more recommendations corresponding to content items available via a content distribution system;

receive, from a user device, a content recommendation request representing one or more desired content attributes;

generate a dummy content item having metadata representing the one or more desired content attributes, wherein the dummy content item does not correspond to an available content item, wherein generating the dummy content item comprises creating an instance of a content item object and assigning said metadata representing the one or more desired content attributes to the content item object;

perform the content recommendation procedure thereby to generate one or more content recommendation candidates for the desired content attributes;

wherein the performing of the content recommendation procedure comprises providing the generated dummy content item or an identifier as the seed content item or seed content item identifier for the dummy content item to the item based procedure.

* * * * *